Dec. 31, 1935. H. C. WILLIAMSON 2,026,335
METHOD OF AND APPARATUS FOR CONTROLLING THE
SUBLIMATION OF SOLID CARBON DIOXIDE
Filed July 30, 1934 2 Sheets-Sheet 1
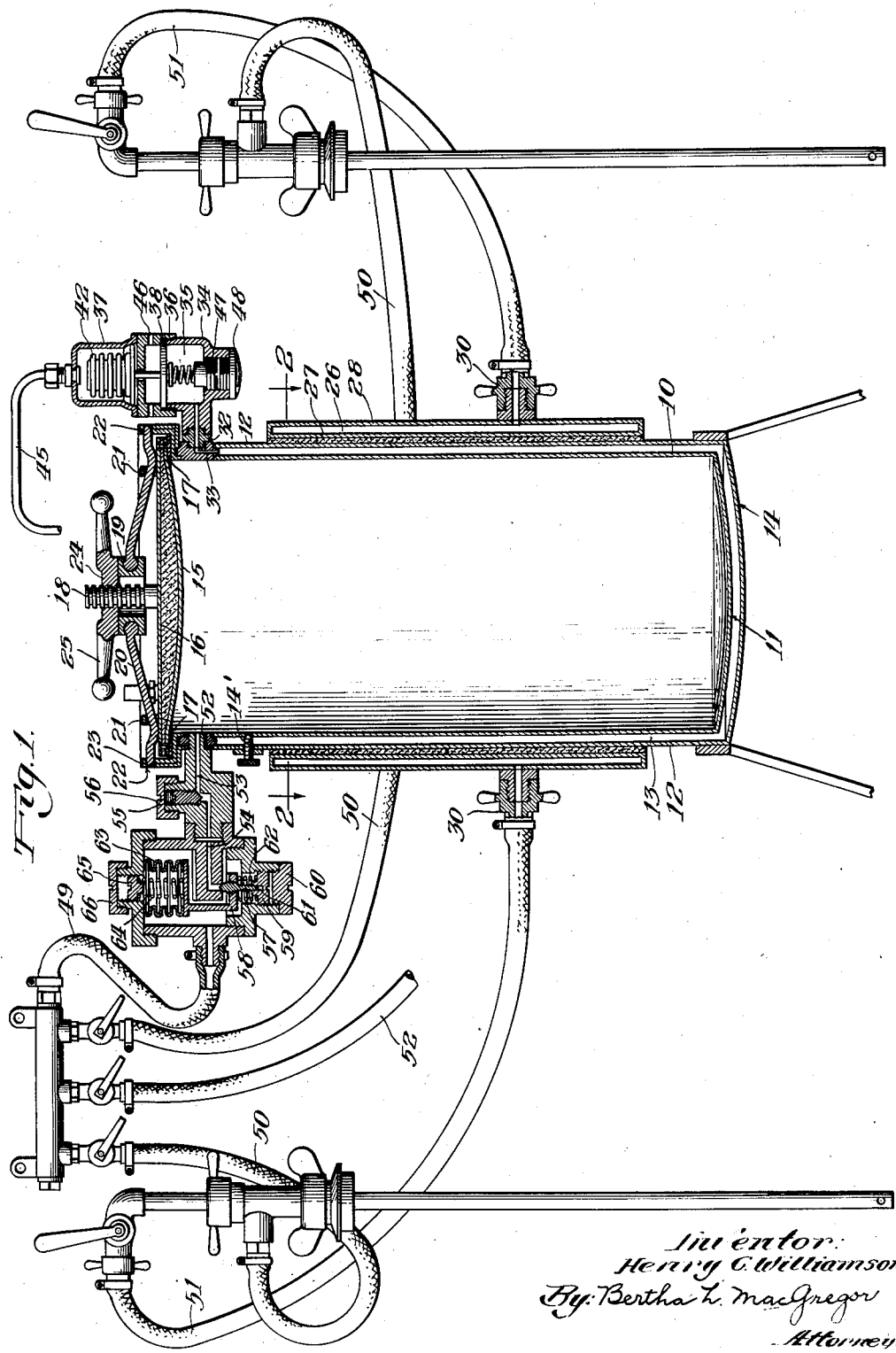
Inventor:
Henry C. Williamson
By: Bertha L. MacGregor
Attorney.

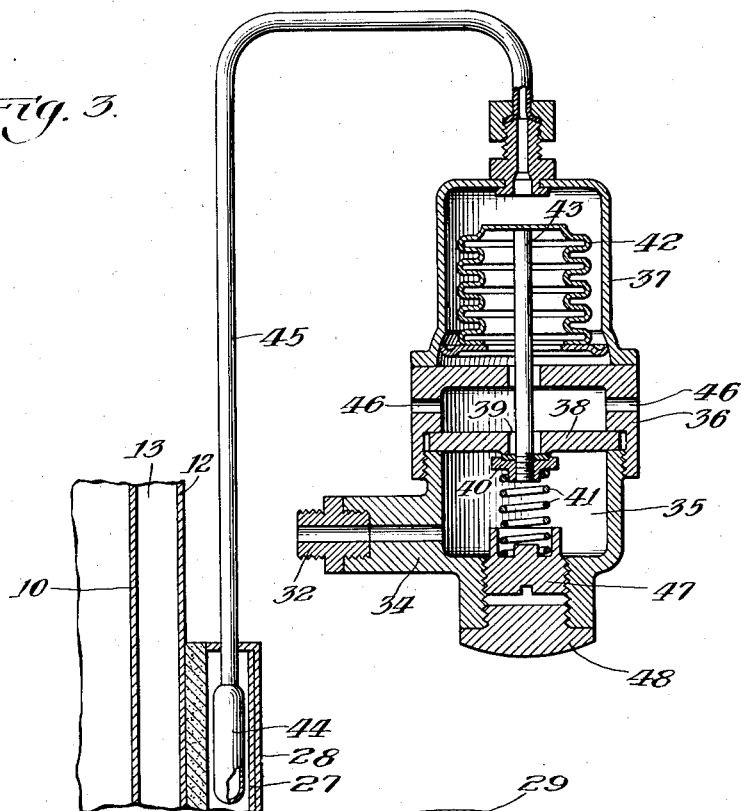
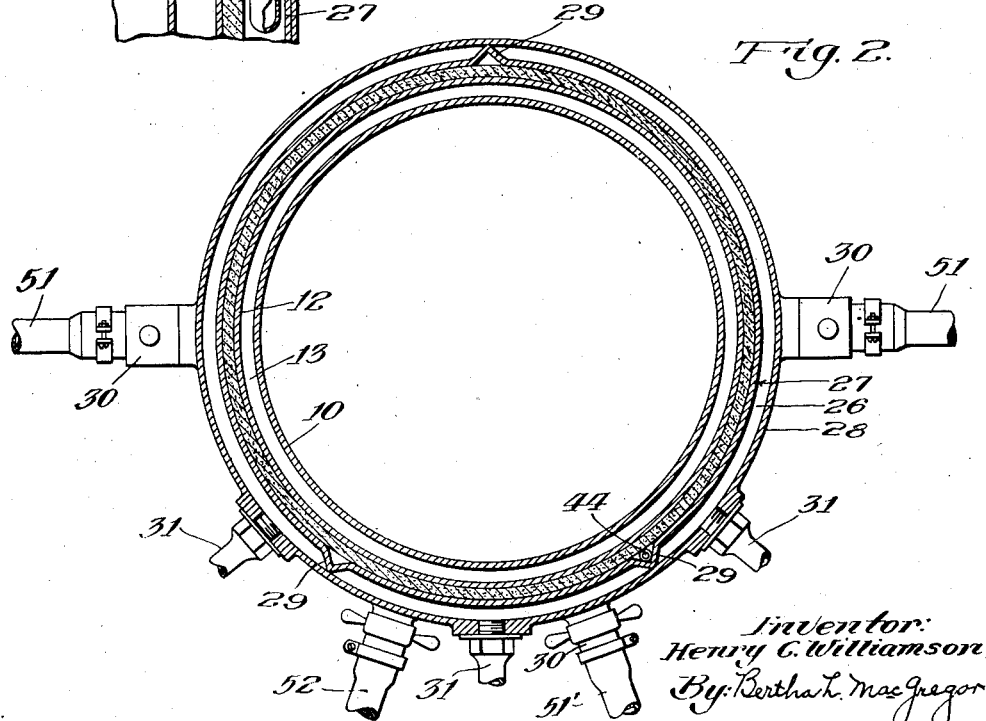

Patented Dec. 31, 1935

2,026,335

UNITED STATES PATENT OFFICE 2,026,335

METHOD OF AND APPARATUS FOR CONTROLLING THE SUBLIMATION OF SOLID CARBON DIOXIDE

Henry C. Williamson, Chicago, Ill., assignor to The Beckley-Ralston Co., Chicago, Ill., a corporation of Illinois Application July 30, 1934, Serial No. 737,503

3 Claims. (Cl. 62—91.5)

This invention relates to a method of and apparatus for controlling the sublimation of solid carbon dioxide, and more particularly to such method and apparatus adapted for the refrigeration and carbonation of beverages.

One object of the invention is to provide apparatus of the character specified, adapted to be associated with a beverage container or containers, such for example as beer kegs or barrels from which the beverage or beverages are conveyed to the apparatus of my invention for the purpose of cooling and carbonating the same.

Another object of the invention is to provide in combination with a container for solid carbon dioxide, thermostatically operated means influenced by the variations in temperature of the material to be cooled for actuating a valve which controls the sublimation of the solid carbon dioxide, thereby rendering the apparatus automatic in its operation and efficient for producing $CO_2$ gas as required for treating the material to be refrigerated.

Another object of the invention is to provide apparatus including a compartment for the reception of solid carbon dioxide, with means for controlling the sublimation of the solid carbon dioxide and for employing the gases and pressure obtained by the sublimation of the solid carbon dioxide for the purpose of refrigerating, carbonating and dispensing the beverage.

While I have shown my invention as embodied in apparatus for carbonating, refrigerating and dispensing beverages, it will be understood from the following description and claims that the invention is not limited to the construction shown, nor to the performance of these combined objects, for obviously that part of the apparatus which is essential for the controlled sublimation of the solid carbon dioxide may be employed for refrigerating materials which do not require to be carbonated.

In the drawings:

Fig. 1 is a vertical section, partly in elevation, showing apparatus embodying my invention.

Fig. 2 is a horizontal section taken on the lines 2—2 of Fig. 1.

Fig. 3 is an enlarged view in vertical section of the valve for controlling the sublimation of the $CO_2$.

In that embodiment of the invention which I have chosen to illustrate in the drawings, the container for holding solid carbon dioxide and gas formed by the sublimation of solid carbon dioxide comprises an inner cylindrical wall 10, concave bottom 11, outer cylindrical wall 12 spaced from the wall 10 to form an annular chamber 13, and outer bottom 14. The space within the walls 10 and 11 for holding solid carbon dioxide has restricted communication with the gas chamber 13 through a hand operated needle valve 14'. The container is closed by a cover comprising a convex wall 15 and flat top 16 insulated from each other and riveted together near their peripheries. The cover rests on a gasket 17 and is held down on the container by means of threaded pin 18 situated in the center of the cover, surrounded by a sleeve 19 which is recessed to receive the ends of a plurality of arms 20 which fulcrum at 21 and have their outer ends reposing within recesses 22 in the flange 23 surrounding the upper portion of the container, and a nut 24 threaded upon the pin 18 provided with handles 25 by which the nut may be rotated. By rotating the nut 24, pressure is brought to bear upon the sleeve 19, thereby urging the inner ends of the arms 20 downwardly and the outer ends thereof upwardly to cause the arms 20 to bear upon the cover 16, preventing leakage of the gas formed by the sublimation of the solid carbon dioxide.

In the form of apparatus shown in the drawings, an annular chamber 26 for holding a beverage or beverages surrounds the annular gas chamber 13. The chamber 26 is defined by an inner wall 27 and an outer cylindrical wall 28 joined together at the top and bottom, and insulated, if desired, from the wall 12 of the gas chamber. The beverage chamber 26 may be divided into separate compartments if desired, by means of vertical partitions 29 which, as shown (Fig. 2) are integral with the inner wall 27. Thus I provide holders for different beverages, as for instance, dark beer, light beer and water. Each of the chambers 26 is provided with a beverage inlet 30 and a dispensing faucet 31.

As the solid carbon dioxide in the container 10 sublimates, the gas enters the annular chamber 13 and the heat from the beverages contained in the annular chambers 26 is absorbed by the cold gases within the chamber 13. The pressure within the chamber 13 is low relative to the pressure within the solid carbon dioxide chamber. The means for controlling the sublimation of the solid carbon dioxide governs the escape of $CO_2$ from the gas chamber 13 into which it has entered through the restricted valved opening 14.

The control means comprises a valve having a nipple 32 threaded into the wall 12 of the container, provided with a passage therethrough which communicates with a passage 33 leading to the low pressure chamber 13. The passage in the nipple 32 communicates with a passage in the main body 34 of the control valve, the latter passage entering a chamber 35 in the valve. The valve is comprised of the section 34 superimposed by sections 36 and 37. Interposed between the sections 34 and 36 is a plate or valve seat 38 having a central passage 39 therein and a valve 40 in control of this passage. A spring 41 within the chamber 35 normally holds the valve 40 closed. A bellows 42 has operative connection with the valve 40 through the rod 43.

Between the wall 27 of the beverage chamber and the wall 12 of the gas chamber, and preferably adjacent the partition wall 29 when the chamber 26 is divided into compartments, is a thermostat bulb 44 which has communication with the portion 37 of the valve through the tube 45. When warm beer or other beverage is introduced into the annular chamber 26 from the barrel (not shown), through inlet 30, heat is transferred to the bulb 44 which is affected thereby, expanding the thermo-element therewithin and bringing pressure to bear upon the bellows 42 within the valve section 37. The valve 40 is thus opened when the pressure is sufficient to overcome the resistance of the spring 41 within the valve section 34. $CO_2$ gas confined in the low pressure chamber 13 is thus allowed to pass into the valve chamber 35 through the valve opening 39 and to atmosphere through the apertures 46 in the intermediate valve section 36.

Further sublimation of the solid carbon dioxide is thereby permitted and the latent heat of sublimation is effective in reducing the temperature of the beverage within the chamber 26. When a predetermined temperature is obtained or has been established within the thermo-element 44, the contraction of the element releases the pressure on the bellows 42, thereby releasing the valve 40 to the influence of the spring 41 which latter closes the valve 40 against further escape of gas. The gas is then allowed to build up a pressure within the low pressure chamber 13, affording the necessary pressure to retard sublimation.

Adjustment of the pressure of the spring 41 may be made through the medium of the element 47 which is concealed and protected by the cap 48.

Referring now to that part of the apparatus which is provided for the carbonating and dispensing of the beverage or beverages, I have chosen to illustrate herein means for carbonating and dispensing beverages from two containers, such as beer barrels (not shown) and for carbonating water from a source of supply under pressure. Consequently I have provided means for conveying $CO_2$ under pressure from the solid carbon dioxide container 10 to the beverage containers (not shown), through a conduit 49, and conduits 50, 50, and for conveying the beverages and $CO_2$ to the inlets 30 to chambers 26 through conduits 51, 51, whereby the beer or other beverage is simultaneously carbonated and put under pressure for dispensing the same through faucets 31. Since the water is brought to its chamber 26 under pressure, from any suitable source of supply 51', $CO_2$ for carbonating it is conveyed directly from chamber 10 through conduit 52 to chamber 26.

The means for controlling the passage of $CO_2$ to the chambers 26 comprises a valve having a nipple 52 with a passage 53 therethrough communicating with a passage 54 in the main body of the valve. A regulating element 55 controls the passage of sublimated gas through the passage 53 and this element may be adjusted with a screw driver or similar instrument by removing the protecting cap 56. Passage of the sublimated gas is further controlled by a needle valve 57 which is threaded into a movable portion 58 within the main body of the valve. Adjustment of the needle valve 57 may be made by rotating the valve retainer 59 after removing the protecting cap 60. A slot 61 within the valve retainer 59 allows the needle valve 57 to move vertically. A spring 62 bears against the movable element 58 within the main body of the valve and normally closes the passage 54. Acting against the spring 62 is a bellows 63 in which is contained a spring 64. Adjustment of the spring 64 is made through the medium of the slotted element 65 which is covered by the protecting cap 66. A predetermined pressure is maintained in the bellows 63 which has the effect of maintaining the needle valve 57 normally open to allow sublimated gas to pass from the solid carbon dioxide chamber into the beer barrel or other container, not shown, through the conduits 49, 50, 50.

As long as the pressure within the beverage container, or in other words the conduit 49 is sufficient, the valve 57 remains closed but if the pressure drops within the conduit 49 the pressure within the bellows 63 is such that the valve 57 will be opened, due to the downward movement of the movable element 58 which carries the valve 57. Accordingly, gas pressure is transferred from the container 10 to the beverage container or containers through the passages 53, 54 and conduits 49 and 50, 50.

From the foregoing it will be understood that the valve on the left in Fig. 1 controls the $CO_2$ gas pressure in the beverage containers (not shown) and the annular beverage chamber 26, and this pressure not only serves to carbonate the beverage but likewise furnishes the necessary pressure to effect dispensation of the beverage through the faucets 31. The valve on the right in Fig. 1 is solely for the purpose of controlling the sublimation of the solid carbon dioxide and thereby the cooling of the beverage within the annular chamber or chambers 26. Thus the sublimation of the solid carbon dioxide is controlled by the thermostatically actuated valve which controls the escape of gas from the chamber 13, into which the gas enters, through the valved opening 14', from the chamber 10; the varying pressure in the gas chamber 13 serving to retard or accelerate the sublimation of the solid carbon dioxide to form $CO_2$ gas as required for refrigeration purposes, or when the apparatus is used as herein described, as required for refrigeration, carbonation and dispensing purposes.

By the use of my apparatus I am enabled to carbonate water at relatively low $CO_2$ pressure. This is made possible by the fact that as the water reaches the chamber 26 it becomes instantly cooled and the $CO_2$ gas carbonates it efficiently at low pressure. This instant cooling is facilitated by reason of the relatively small volume of water spread over a relatively large refrigerating surface. My method is a departure from the established practice of carbonating water at atmospheric temperatures, in large volume, requiring high $CO_2$ pressure.

It will be understood that the conduits 51' and 52 carrying water and $CO_2$ to the water chamber 26 are supplied with check valves to adjust the relative pressures in said lines.

Changes may be made in details of construction without departing from the scope of my invention and I do not intend to be limited to the exact form shown and described, except as set forth in the appended claims.

I claim:—

1. Refrigerating and carbonating apparatus comprising a container for holding solid carbon dioxide, an annular chamber surrounding the solid carbon dioxide container for holding gas formed by the sublimation of the solid carbon dioxide, said gas chamber having restricted communication with the solid carbon dioxide container, a second annular chamber surrounding the annular gas chamber for holding beverages to be cooled and carbonated, a valve controlled conduit between the container holding the solid carbon dioxide and the said beverage chamber, and permitting passage of carbon dioxide gas under pressure to said beverage chamber, and valve means for controlling the escape of gas from the gas chamber.

2. Refrigerating and carbonating apparatus comprising a container for holding solid carbon dioxide, an annular chamber surrounding the solid carbon dioxide container for holding gas formed by the sublimation of the solid carbon dioxide, said gas chamber having restricted communication with the solid carbon dioxide container, a second annular chamber surrounding the annular gas chamber for holding beverages to be cooled and carbonated, a valve controlled conduit between the container holding the solid carbon dioxide and the said beverage chamber, and permitting passage of carbon dioxide gas under pressure to said beverage chamber, and valve means comprising a thermostatic element located adjacent the beverage chamber and a pressure-operated valve actuated by the thermostatic element for controlling the escape of gas from the gas chamber.

3. Apparatus for refrigerating, carbonating and dispensing beverages, comprising a container for solid carbon dioxide, a gas chamber surrounding the container for receiving sublimated carbon dioxide from said chamber, a thermostatically controlled valve on the gas chamber controlling the escape of gas, a beverage refrigerating chamber surrounding the gas chamber, an independent container for beverage supply, a valve conduit between the solid carbon dioxide container and said independent beverage supply container for conveying sublimated carbon dioxide to the independent container, means for conveying the beverage and sublimated carbon dioxide to the beverage refrigerating chamber, and means for dispensing the beverage from the refrigerating chamber.

HENRY C. WILLIAMSON.